United States Patent [19]

Eppler

[11] 4,230,295
[45] Oct. 28, 1980

[54] DEVICE TO SUPPORT RUDDERS AND TRAILING EDGE FLAPS OF AIRCRAFT AND WATERCRAFT

[76] Inventor: Richard Eppler, Leibnizstrasse 84, 7000 Stuttgart 1, Fed. Rep. of Germany

[21] Appl. No.: 968,237

[22] Filed: Dec. 11, 1978

[30] Foreign Application Priority Data

Dec. 13, 1977 [DE] Fed. Rep. of Germany ....... 2755442

[51] Int. Cl.² ............................ B64C 9/02; B64C 3/50
[52] U.S. Cl. ....................................... 244/213; 16/164; 244/215; 244/87; 114/165
[58] Field of Search ............... 244/213, 214, 215, 216, 244/219, 87; 114/162, 165; 16/162, 163, 164

[56] References Cited

U.S. PATENT DOCUMENTS

| | | | |
|---|---|---|---|
| 2,086,085 | 7/1937 | Lachmann et al. | 244/215 |
| 2,158,676 | 5/1939 | Engelhardt | 244/216 |
| 2,563,453 | 8/1951 | Briend | 244/216 |
| 2,589,026 | 3/1952 | Phillips | 244/216 |
| 2,608,364 | 8/1952 | Gordon et al. | 244/216 |
| 2,721,353 | 10/1955 | Mackintosh | 16/164 |
| 4,012,013 | 3/1977 | Ball et al. | 244/219 |
| 4,131,253 | 12/1978 | Zapel | 244/215 |

FOREIGN PATENT DOCUMENTS

| | | | |
|---|---|---|---|
| 386926 | 12/1923 | Fed. Rep. of Germany | 244/215 |
| 424064 | 1/1926 | Fed. Rep. of Germany | 244/215 |
| 2114459 | 9/1972 | Fed. Rep. of Germany | 244/213 |
| 846034 | 9/1939 | France | 244/215 |

*Primary Examiner*—Galen L. Barefoot
*Attorney, Agent, or Firm*—Schwartz, Jeffery, Schwaab, Mack, Blumenthal & Koch

[57] ABSTRACT

A supporting device is disclosed for an arrangement of articulated elements such as a fin-rudder arrangement, wing-trailing edge flap arrangement, and the like, for aircraft or watercraft. The disclosure more particularly relates to the cover for the gap existing between the two articulated elements. There is disclosed an arrangement of levers and bearing points which allow the cover to maintain a constant length and approximately constant curvature over its length as the two elements move relatively to each other. The arrangement of the disclosure eliminates corners and folds in the elastic cover without also requiring parts protruding beyond the elastic cover and without requiring high forces to deflect the cover.

10 Claims, 6 Drawing Figures

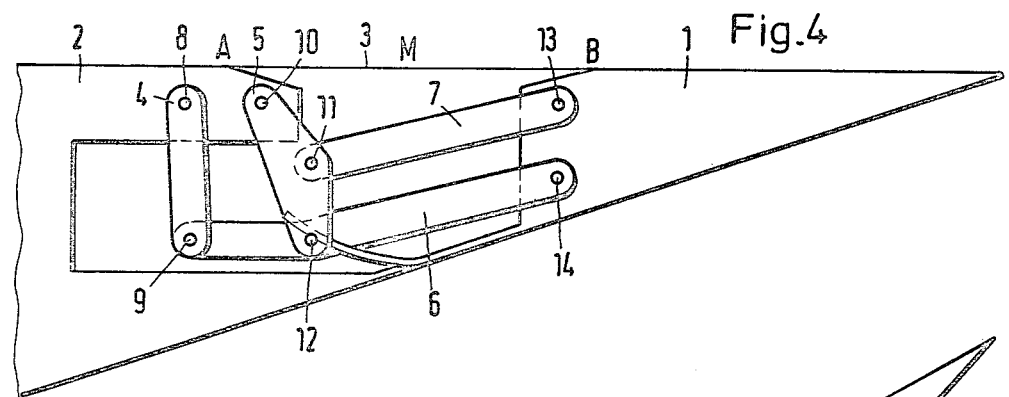
Fig. 4
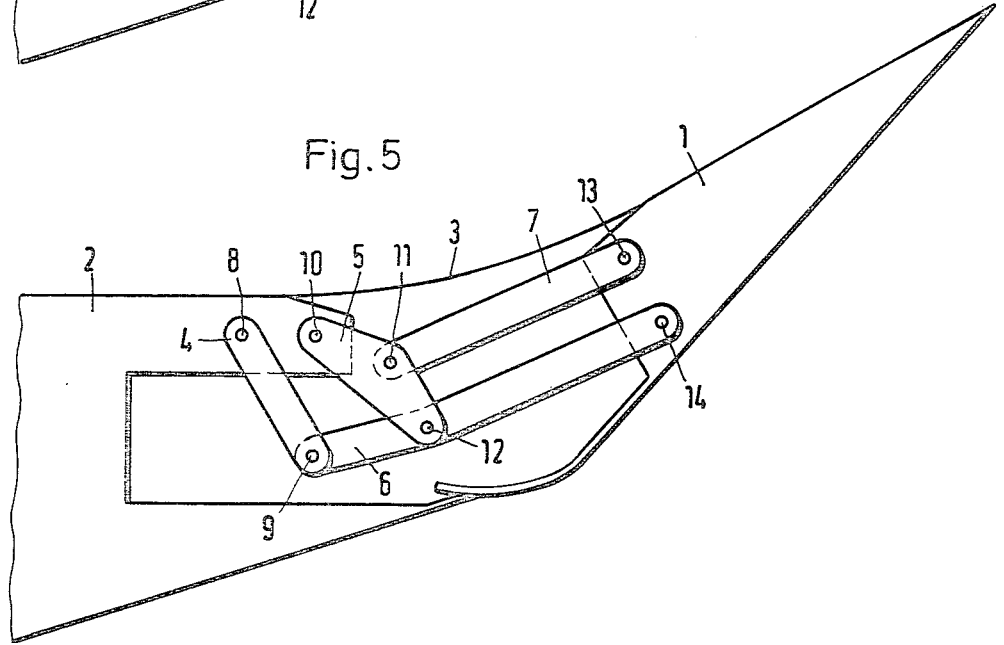
Fig. 5
Fig. 6
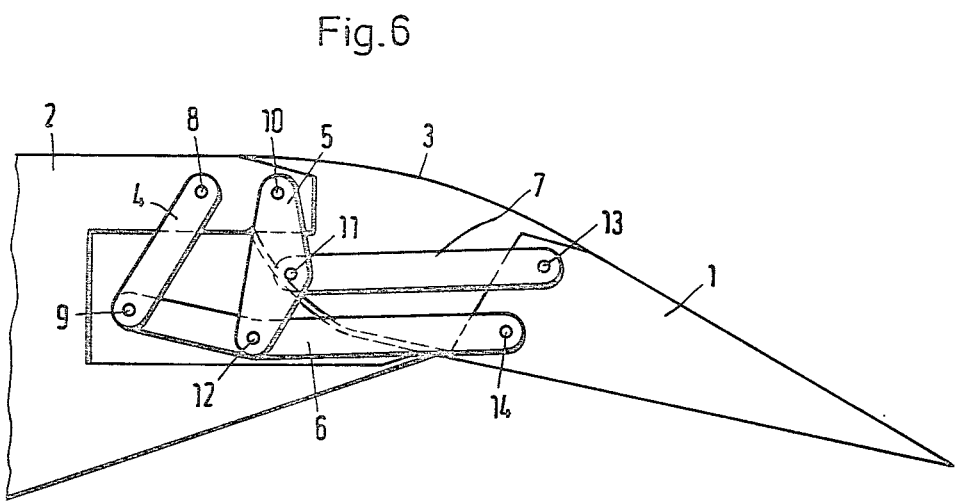

DEVICE TO SUPPORT RUDDERS AND TRAILING EDGE FLAPS OF AIRCRAFT AND WATERCRAFT

BACKGROUND (1) Field of the Invention

The invention relates to a device to support rudders and trailing edge flaps of aircraft and watercraft with a cover for the gap existing between the rudder and the corresponding fin or wing, respectively, the cover connecting tangentially with the fin and the rudder.

For the sake of simplicity, hereinafter reference will be made only to the support of a rudder in a rudder fin, whereby the entirety of the rudder and the fin shall be designated the steering gear. This is analogous to the support of ailerons and trailing edge of flaps in the wing of an aircraft or a hydrofoil boat, for which the invention is particularly suitable.

(2) Description of the Prior Art

In a known embodiment of such a device, the rudder is rotatingly supported around a stationary axis of the fin. Without an additional device, the gap generated in this manner between the rudder and the fin is penetrated by a flow of air, introducing a large volume of detrimental drag and decreasing the efficiency of the rudder. Due to this known fact, the gap is frequently sealed adhesively by means of a soft, air-tight strip in efficient aircraft. Although this solution has demonstrated advantages, it still represents an unsatisfactory solution of the problem, since the adhesively bonded strip must necessarily form corners and wrinkles whenever the rudder is in motion. Because the length to be covered differs in accordance with the various positions of the rudder, the cover strip must be just tight in the lowest position of the rudder, whereby corners are formed in its external configuration. In the undeflected position, the strip forms wrinkles which are aggravated in the upwardly deflected position. It is also known to arrange the rotational axis of the rudder exactly in the top side of the wing, see DE-PS 424 064. The cover strip is then able to cover the sharp edge generated between the rudder and the fin, without forming large folds. The disadvantage therein, however, consists of the fact that the support, which does not extend over the entire length of the rudder but is restricted to individual locations, protrudes beyond the configuration of the wing. At this location and at the sharp edge prevailing during the deflection of the rudder, a certain amount of detrimental drag is still generated, causing reduced steering efficiency and in watercraft the increased danger of cavitation.

For this reason, another arrangement according to DT-PS 386 926 provides a cover for the rudder gap by means of special metal strips, the strips being supported swingingly in the surface of the fin and pressed elastically onto the rudder, upon which they slide during the deflection of the rudder. In the process, the interfering edges of the arrangement are reduced but not eliminated, while the forces required to move the rudder become excessive due to the sliding friction at forces which are generated. The same is true for the arrangement of FR P 524 814. There, the cover strips are provided with slits which engage with guiding devices mounted on the rudder.

In another aerodynamically and cavitationally favorable arrangement according to DT-PS 386 926, the existence of an external skin of the craft is assumed, the skin passing over on both sides without a slit, into the outer skin of the rudder. During the deflection of the rudder, the entire outer skin of the rudder must then slide on the rudder, again leading to excessive force requirements during steering.

Finally, attempts have been made for decades, particularly in the case of gliders, to design the fins or the top side of the wing, respectively, in an elastic manner and to deform the rear part of the steering gear elastically, whereby a gap would be formed on the bottom side only. All of these solutions have the common characteristic that as the result of the aerial forces and momentum generated at the deformable part of the fin, the elastic top side of the fin must transfer high compressive forces. The top side must therefore be designed to have suitable strength, and this requires strong forces for deformation. For this reason, none of these solutions have been successful to date.

In another known device, the rudder is supported so that the slit may be covered elastically, i.e. without corners and folds, without the need for such covers to be used for the transfer of forces (German application P 21 14 459.2-22). In this solution, the rudder is guided by means of a bearing device so that the cover has the same length s in all positions of the rudder and so that the cover may have an approximately constant curvature over this length. The cross-section of the cover should always approximately represent a circular arc or a straight line of constant length. It is only necessary for the cover to maintain its own configuration, whereby it may be bonded adhesively to the rudder and the fin. With the exception of the forces which retain it in its constant shape, the cover is not required to transfer other forces. It may be very thin and the force needed for its deformation is not substantial.

A movement of the rudder which would satisfy this requirement ideally may be described and expressed very simply by a formula, in which the cover is to pass tangentially into the fin and the rudder and is to have an exactly constant curvature over its length s, which is also constant. For this ideal movement, the so-called instantaneous pole of the motion may be calculated in any position, by means of known methods (see: W. Wunderlich, "Planar Kinematics", Mannheim 1970, pp. 16–19). In this manner, the locus of the instantaneous center (center path curve) and the so-called path curve variation (herpolhode curve) of the ideal motion may be found. These lines indicate that the ideal motion may be described very accurately, but not exactly, by imagining that circular disks having radii of one-third s are connected with both the rudder and the fin, the disks contacting each other in the nondeflected position (zero position) in the center of the cover with their tangent line perpendicular to the cover and rolling upon each other during movement of the rudder. In particular, the instantaneous center of motion for the zero position is located in the center of the cover.

Furthermore, the path of each point of the rudder may be readily calculated during ideal motion; and it is designated the ideal path of the point of the rudder. It does not represent a circular path, just as for example the path of a point of a wheel rolling down a plane does not generate a circular path but a so-called cycloid. One point of the ideal path thus corresponds to the zero position of the rudder and therefore defines the position of the chosen point of the rudder in the zero position, i.e. the nondeflected state of the rudder. In the vicinity of the point the ideal path may be approximated by a curve, having the same tangent and the same curvature at this point, as the ideal path. The tangent is given by a line perpendicular to the connecting line to the instantaneous center, which in the zero position is located in the center of the cover. The curvature k at a point P of a path may be calculated by known methods (see for example: Bronstein-Semendjajew, "Handbook of Mathematics", p. 205). The curvature k is visualized by its reciprocal value, the radius K of curvature. The circle of curvature having the radius R and contacting the path at P, is a second order approximation of the path in the vicinity of P. In case of a sufficiently smooth path, the deviation between the path and the circle of curvature is proportional to the third power of the distance to P. If the chosen point of the rudder is displaced from the end point B of the cover downward by y and by x in the direction of the fin, then the following equation yields the radius of curvature R of the ideal path at the point P, corresponding to the zero position:

$$R = \frac{\left[y^2 + \left(\frac{s}{2} - x\right)^2\right]^{\frac{3}{2}}}{y^2 + \left(\frac{s}{2} - x\right)\left(\frac{s}{3} - x\right)}.$$

The same formula is valid for the relative motion of a point of the fin with respect to the rudder assumed to be at rest. In this case, it is merely necessary to measure y from the end point A of the cover in the direction of the rudder.

A device capable of satisfactorily approximating the ideal motion is described in the German application P 21 14 459.2-22. According to this invention, the rudder is supported by means of a so-called four bar arc so that two points of the rudder move on the circle of curvature of their ideal path as defined hereinabove. However, part of this four bar arc protrudes beyond the elastic cover, so that said cover must be interrupted at these bearing locations. The hole formed in the process is covered by a rubber scoop, which again presents a certain drag. In addition, two bearing points of the four bar arc must be located closely adjacent to each other, which renders the design embodiment of this solution difficult.

SUMMARY

It is the object of the invention described herein to avoid these disadvantages and to provide a supporting device of the type mentioned in the introduction hereto, which is located entirely beneath the elastic cover and which approximates the ideal motion described hereinabove as the four bar arc of DPA 21 14 459.2-22.

The object of the invention is achieved by providing a supporting device for first and second articulated elements having external surfaces thereon, between which elements a gap is formed and between the surfaces of which a cover for the gap tangentially extends. The first and second elements are movable between an undeflected zero position relative to each other and deflected positions relative to each other. The supporting device comprises a multi-bar arc extending between the first and second elements, the multi-bar arc being disposed entirely internally of the cover and the external surfaces of the first and second elements. The multi-bar arc includes first, second, third and fourth levers and first, second, third, fourth, fifth, sixth and seventh bearing points on the levers. The first bearing point provides a connection between the first lever and the first element. The second bearing point provides a connection between the first and third levers. The third bearing point provides a connection between the third lever and the first element. The fourth bearing point provides a connection between the second lever and the fourth lever. The fifth bearing point provides a connection between the second and third levers. The sixth bearing point provides a connection between the fourth lever and the second element. Finally, the seventh bearing point provides a connection between the third lever and the second element. The first and second bearing points define a straight line. The third and fifth bearing points define another straight line, and the seventh bearing point and a point at the center of the cover in the undeflected position defines yet another straight line. These straight lines, when the first and second elements are in the undeflected zero position, each intersect at a common point, which common point may be located at infinite distance from the bearing points. As the first and second elements move relatively into deflected positions, the cover maintains a constant length and approximately a constant curvature over such length, and, corners and folds in the cover are substantially eliminated.

According to more specific aspects of the invention, the seventh bearing point moves in a path having the same curvature in the location corresponding to the non-deflected position as the ideal path. During relative motion of the first element with respect to the second element, the third bearing point moves in a path having the same curvature in a location corresponding to the nondeflected state as the ideal path of the third bearing point. The design according to the invention not only provides additional aerodynamic advantages but also provides for simplified production, because, for example, the fins and rudders are manufactured in a single production process. Further, accurate installation of the supporting device is facilitated, because simple so-called reference points are available. In the device itself, no closely adjacent bearing locations are required.

The invention shall be described hereinafter in more detail by means of and example of embodiment, which is represented in the drawing.

BRIEF DESCRIPTION OF THE DRAWING

FIG. 4 shows another embodiment with the rudder in its non-deflected position;
FIG. 5 shows the device of FIG. 4 with the rudder rotated upwards;
and
FIG. 6 shows the device of FIG. 4 with the rudder rotated downwards.

DETAILED DESCRIPTION OF THE PREFERRED EMBODIMENT

The cover membrane 3 has a length s in the cross-section of the rudder. The ends A and B of the membrane 3 represent accurate points of reference for the installation of the supporting device. The center of the cover membrane 3 is designated by M in the zero position.

Figure 1:
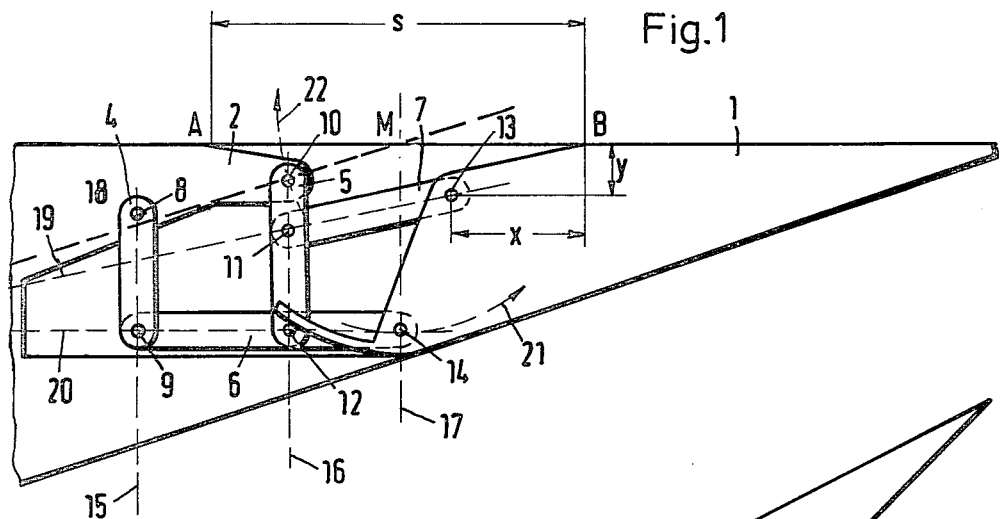
FIG. 1 shows the device to support a rudder in its nondeflected state (zero position)

The supporting device according to the invention consists of four levers 4–7, supported bearingly at seven bearing locations 8–14 within each other and in the fin 2 and the rudder 1. In the arrangement, the bearing 14 of the lever 6 in the rudder 1 is guided by means of a so-called four bar arc 8-9-10-12, wherein levers 4, 5 and 6 are operative, on a fixed path 21, while lever 7 merely controls the rotation of the lever around the point 14. Conversely, the rudder may be imagined to be stationary and the motion of the fin relative to the rudder considered. In this mode of consideration, the bearing 10 of the fin 2 is guided by means of the four bar arc 11-12-13-14 with levers 5, 6 and 7 on a fixed track relative to the rudder 1, while the lever 4 controls the rotation around the bearing 10. The ideal motion described hereinabove may be approximated very well with this arrangement. This object may be attained by providing that the instantaneous center of the motion of the rudder and of the relative motion of the fin with respect to the rudder, is located in the zero position in the center M of the cover. This requires merely that the straight lines 15, 16, 17 defined by the pairs of points 8-9, 10-12 and M-14 intersect at a common point, which, as in the example of embodiment, may be located in the infinite. The straight lines are then parallel to each other. The same is true for the straight lines 18, 19 and 20 through the pairs of points M-10, 11-13 and 12-14 which in the example of embodiment (FIG. 1) intersect in a point located in the finite but outside FIG. 1.

It must be further provided that the path 21 of the bearing 14 in the rubber 1 during its motion, and the path 22 of the bearing 10 of the fin 2 during its motion relative to the rudder, have the same curvature, in the points corresponding to the zero position, as the ideal paths. This may be obtained by keeping the radii of curvature of the paths 21 and 22, by, for example, means of a suitable choice of the lengths of the levers 4 and 7, equal in size to those of the corresponding ideal paths.

Figure 2:
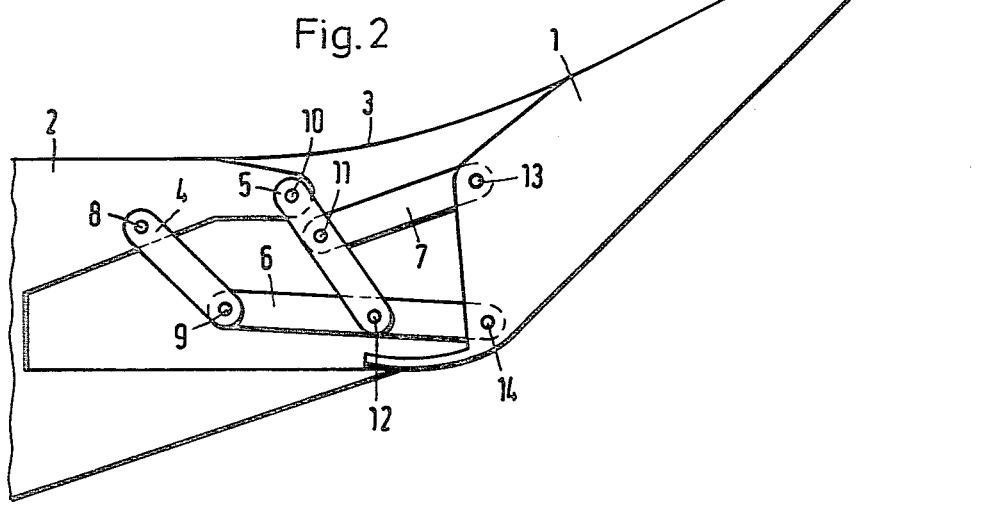
FIG. 2 shows the rudder rotated upwards.
Figure 3:
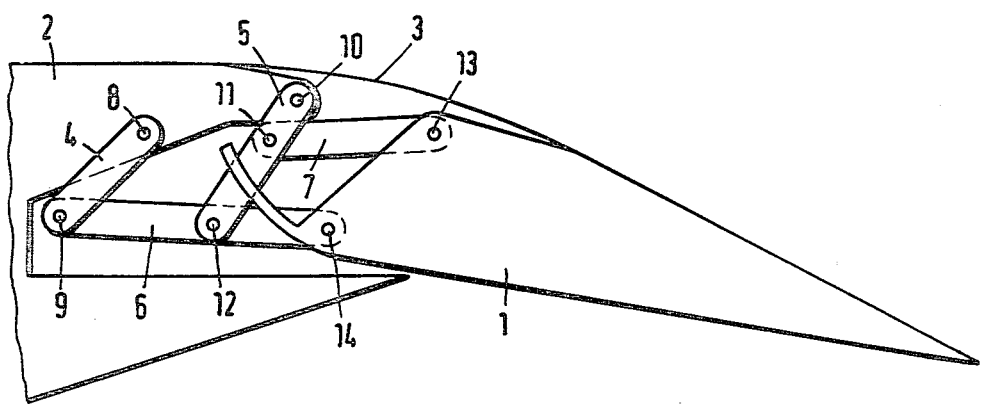
FIG. 3 shows the rudder rotated downwards.

These statements allow considerable room for play. Specifically, it is not required that the bearings 10, 11, 12 and 9, 12, 14 be located on a straight line. In this manner, the entire device may be adapted to prevailing space conditions, while the rotation of all of the levers remains possible. FIGS. 2 and 3 show the outwardly rotated positions of the example of embodiment of FIG. 1.

A particularly simple means of determining the entire configuration consists of designing one of the four bar arcs as a parallelogram track. An example of an embodiment of this type is represented in FIG. 4. The four bar arc 11-12-13-14 is now in the shape of a parallelogram. The bearing 10 then moves relatively to the rudder on a circle with a radius of 11-13 and 12-14, respectively. It is thus only necessary to render these lengths equal to the radius of curvature R required (see the discussion in the seventh paragraph of the preceding "Description of the Prior Art" section) and to insure that the corresponding levers 6 and 7 are parallel to 10-M in the zero position.

The example of embodiment of FIG. 4 contains another simplification. The second condition of curvature, requiring that the path of the bearing point 14 of the rudder 1 have the same curvature as its ideal path, has not been satisfied therein. The bearing device created in this manner approximates the ideal motion well enough to be adequate for numerous applications. It is mainly necessary to observe accurately the distances of the points A and B in the vicinity of the zero position. In the case of large deflections, the elastic cover, due to its curvature, is capable of equalizing inaccuracies.

What is claimed is:

1. A supporting device for first and second articulated elements having external surfaces thereon, between which elements a gap is formed and between the external surfaces of which a cover for the gap tangentially extends, the first and second elements being movable between an undeflected zero position relative to each other and deflected positions relative to each other, the supporting device comprising a multi-bar arc extending between the first and second elements, said multi-bar arc being disposed entirely internally of the cover and the external surfaces of the first and second elements, said multi-bar arc including:
   (a) first, second, third and fourth levers;
   (b) first, second, third, fourth, fifth, sixth and seventh bearing points on said levers, said first bearing point providing a connection between said first lever and the first element, said second bearing point providing a connection between said first and third levers, said third bearing point providing a connection between said second lever and said first element, said fourth bearing point providing a connection between said second lever and said fourth lever, said fifth bearing point providing a connection between said second and third levers, said sixth bearing point providing a connection between said fourth lever and the second element and said seventh bearing point providing a connection between said third lever and the second element;
   (c) said first and second bearing points defining a straight line, said third and fifth bearing points defining another straight line and said seventh bearing point and a point at the center of the cover defining yet another straight line; and
   (d) said straight lines, when the first and second elements are in the undeflected zero position, each intersect at a common point whereby, as the elements move relatively into deflected positions, the cover maintains a constant length and approximately a constant curvature over such length.

2. A supporting device as defined in claim 1 wherein the second element is a rudder for a craft.

3. A supporting device as defined in claim 1 wherein the first element is a wing.

4. A supporting device as defined in claim 1 wherein the second element is a trailing edge flap for a craft.

5. A supporting device as defined in claim 1 wherein the second element is an aileron for a craft.

6. A supporting device as defined in claim 1 wherein the first element is a fin for a craft.

7. A supporting device as defined in claim 1 wherein the craft is an aircraft.

8. A supporting device as defined in claim 2 wherein the craft is a hydrofoil boat.

9. A supporting device as defined in claim 1 wherein said common point at which said straight lines intersect is located an infinite distance from said bearing points.

10. A supporting device as defined in claim 1 wherein said common point at which said straight lines intersect is located at a finite distance from said bearing points.

* * * * *